(12) United States Patent
Wilson

(10) Patent No.: US 7,821,984 B2
(45) Date of Patent: Oct. 26, 2010

(54) SATELLITE DISTRIBUTED HIGH SPEED INTERNET ACCESS

(76) Inventor: W. David Wilson, 806 Old South Riverside Dr., Batavia, OH (US) 45103

( * ) Notice: Subject to any disclaimer, the term of this patent is extended or adjusted under 35 U.S.C. 154(b) by 514 days.

(21) Appl. No.: 11/155,292

(22) Filed: Jun. 17, 2005

(65) Prior Publication Data

US 2005/0249145 A1 Nov. 10, 2005

Related U.S. Application Data

(63) Continuation-in-part of application No. 10/950,860, filed on Sep. 27, 2004.

(60) Provisional application No. 60/507,022, filed on Sep. 29, 2003, provisional application No. 60/517,044, filed on Nov. 4, 2003, provisional application No. 60/523,061, filed on Nov. 18, 2003.

(51) Int. Cl.
    *H04W 4/00* (2009.01)
(52) U.S. Cl. .................... 370/328; 370/338
(58) Field of Classification Search ............. 455/407, 455/406, 408, 13.3, 12.1, 41.2, 41.3, 13.1, 455/99, 411, 445, 414.1; 370/328, 316, 401, 370/474, 475, 321, 390, 432, 310.2, 338
    See application file for complete search history.

(56) References Cited

U.S. PATENT DOCUMENTS

| | | | |
|---|---|---|---|
| 5,081,703 | A | 1/1992 | Lee |
| 5,678,172 | A | 10/1997 | Dinkins |
| 6,035,178 | A | 3/2000 | Chennakeshu et al. |
| 6,072,768 | A | 6/2000 | Wiedeman et al. |
| 6,212,550 | B1 | 4/2001 | Segur |
| 6,243,450 | B1 | 6/2001 | Jansen et al. |
| 6,263,265 | B1 * | 7/2001 | Fera ........................... 701/19 |
| 6,414,635 | B1 | 7/2002 | Stewart et al. |

(Continued)

FOREIGN PATENT DOCUMENTS

EP 1 024 610 A2 2/2000

OTHER PUBLICATIONS

Unknown, VP1200/VP1210 Vivato Indoor & Outdoor Wi-Fi Base Stations, copyright 2004, Vivato, Inc., San Francisco, CA U.S.A.

*Primary Examiner*—George Eng
*Assistant Examiner*—Brandon J Miller
(74) *Attorney, Agent, or Firm*—McDonnell Boehnen Hulbert & Berghoff LLP

(57) ABSTRACT

A satellite distributed high-speed Internet "Hotspot" enables wireless and hardwired, satellite distributed Internet access aboard a transit vehicle such as a train for anyone with a PC or other web-ready device (wireless ready or cabled) and a valid credit card or prepaid coupon. Internet access is obtained via a ground-based satellite dish, which is operatively coupled to a wireless access point located along the transit route such as a railroad track. The wireless access point is in communication with a wireless transceiver unit located on the transit vehicle, and the Internet signal is distributed to users on the transit vehicle via a router using wired or wireless connections. A plurality of wireless access points can be located along the transit route, thereby allowing the transit vehicle to maintain the Internet connection while traveling along the transit route.

38 Claims, 5 Drawing Sheets

U.S. PATENT DOCUMENTS

| | | |
|---|---|---|
| 6,522,865 B1 | 2/2003 | Otten |
| 6,556,828 B1 | 4/2003 | Carlin et al. |
| 6,584,083 B1 | 6/2003 | Toporek et al. |
| 6,591,084 B1 | 7/2003 | Chuprun et al. |
| 6,611,821 B2 | 8/2003 | Stahl et al. |
| 6,894,990 B1 | 5/2005 | Agarwal et al. |
| 7,050,801 B2 * | 5/2006 | Segal et al. ............... 455/432.1 |
| 7,216,283 B2 | 5/2007 | Shen et al. |
| 7,324,469 B2 | 1/2008 | Wilson |
| 7,343,160 B2 * | 3/2008 | Morton ....................... 455/444 |
| 2001/0010047 A1 | 7/2001 | Shen et al. |
| 2001/0026537 A1 | 10/2001 | Massey |
| 2002/0006116 A1 | 1/2002 | Burkhart |
| 2002/0081969 A1 * | 6/2002 | Chang et al. ................. 455/13.1 |
| 2003/0046242 A1 | 3/2003 | Himmel et al. |
| 2003/0149601 A1 | 8/2003 | Cabral |
| 2003/0157975 A1 * | 8/2003 | Kadel et al. ................. 455/575 |
| 2003/0181162 A1 | 9/2003 | Matula |
| 2003/0210671 A1 * | 11/2003 | Eglin ......................... 370/338 |
| 2004/0184466 A1 * | 9/2004 | Chang et al. ................ 370/401 |
| 2004/0255221 A1 | 12/2004 | Shen et al. |
| 2004/0264700 A1 * | 12/2004 | Kirkland ..................... 380/270 |
| 2005/0044243 A1 * | 2/2005 | Narayanan et al. ........... 709/229 |
| 2005/0105484 A1 * | 5/2005 | Wilson ....................... 370/316 |
| 2005/0135422 A1 | 6/2005 | Yeh |
| 2005/0203835 A1 * | 9/2005 | Nhaissi et al. ................. 705/39 |
| 2007/0115942 A1 | 5/2007 | Money et al. |

* cited by examiner

SATELLITE DISTRIBUTED HIGH SPEED INTERNET ACCESS

CROSS-REFERENCE TO RELATED APPLICATIONS

This application is a continuation-in-part of U.S. patent application Ser. No. 10/950,860, filed Sep. 27, 2004, which claims the priority of provisional application Ser. No. 60/507,022, filed Sep. 29, 2003, provisional application Ser. No. 60/517,044, filed Nov. 4, 2003, and provisional application Ser. No. 60/523,061, filed Nov. 18, 2003. The disclosure of each of these applications is incorporated herein by reference.

BACKGROUND

The continued development of high speed wireless Internet connections permitting the transceiving of real time information has greatly increased the volume and efficiency of work, both commercial and personal, that can be accomplished. This efficiency saves both time and money for its users and is quickly becoming a necessary part of our overall telecommunications infrastructure.

This efficiency however, is not easily accessible unless one has a wireless ready PC, and their own satellite dish and transceiver or is located in or near a city with providers who sell access subscriptions to their equipment. Anyone in transit, such as salesmen, executives, truckers and private individuals has virtually no access while traveling, especially in rural areas. Even in populated areas, one must find a hard-wired commercial access point to get to the Internet. This is time consuming, costly and severely limits the benefits of the Internet in most areas of the country.

SUMMARY

The present invention provides rural "Hotspots" (such as Wi-Fi access, for example) to enable wireless and hardwired, satellite distributed Internet access for anyone with a PC or other web-ready device (wireless ready or cabled) and a valid credit card. The "Hotspots" can be located anywhere there is 120 volt electricity available or access to the sun for a solar panel and enough space to house the transceiver and mount a satellite dish. These "Hotspots" would best be located in areas that experience high volume transient traffic, such as rest areas, restaurants, truck stops, rural hotels, conference centers, motels and state park lodges. A Hotspot may allow access to users with cabled devices, wireless devices, or both.

Accordingly, it is a first aspect of the present invention to provide a method for establishing and operating an Internet Hotspot that includes the steps of: providing a satellite dish communicating with the Internet via data link with a satellite; providing at least one router operatively coupled to the satellite dish; installing the satellite dish and router in a rural location, which experiences a relatively high volume of transient traffic; and allowing a user to access the Internet at the rural location by connecting a user's web-ready device to the Internet via the router and satellite dish. In a more detailed embodiment, the router includes at least one jack to which a web-ready device may be connected via a cable. In a further detailed embodiment the method further includes a step of providing a subscriber access unit operatively coupled between the satellite dish and the router, where a user opens a subscription account via a remote server before the user is enabled to access other websites. Alternately, a user purchases a quantity of subscription-based access time using a credit card via the remote server before the user is enabled to access other websites. The subscription-based access time may be purchased in a definite quantity, or the subscription-based access time may be purchased on a "continued until canceled" basis. The credit card billing may performed by an existing merchant service and the existing merchant service may be reciprocal with other Internet subscription providers nationwide. Optionally, a user's account status is first authenticated by the remote server each time the user establishes a connection with the Hotspot before the user is enabled to access other websites. This authentication of the user's account is performed by a subscriber merchant service.

In an alternate detailed embodiment of the first aspect of the present invention, the connecting step includes a step of communicating the user's web-ready device to the router via a wireless connection. Further, a plurality of users can simultaneously access the Internet by communicating wireless web-ready devices with the router. Further, the method may include a step of operatively coupling a subscriber access between the satellite dish and the router, where a user opens a subscription account via a remote server before the user is enabled to access other websites. With this, a user may purchase a quantity of subscription-based access time using a credit card via the remote server before the user is enabled to access other websites. The subscription-based access time may be purchased in a definite quantity, or the subscription-based access time may be purchased on a "continued until canceled" basis. The credit card billing may performed by an existing merchant service, and the existing merchant service may reciprocate with other Internet subscription providers nationwide. Optionally, a user's account status is first authenticated by the remote server each time the user establishes a connection with the Hotspot before the user is enabled to access other websites. With this the authentication of the user's account is performed by a subscriber merchant service. Alternatively, the method further includes the steps of operatively coupling at least one wireless transceiver extender unit between the satellite dish and the router to extend the range of Internet access at the rural location.

The method of the first aspect may further include the steps of operatively coupling at least one wireless transceiver extender unit between the satellite dish and the router to extend the range of Internet access at the rural location.

It is a second aspect of the present invention to provide a method for providing satellite-distributed high-speed Internet access that includes the steps of: providing a router to which a web-ready device may be connected via at least one of a cable and a wireless data link; assigning a dynamic IP address to the web-ready device that has been connected to the router; forwarding by the router of the user's connection to a subscriber access unit; retrieving from memory by the subscriber access unit of the static IP address of a remote server; forwarding the user's connection to a satellite dish; establishing communication by the satellite dish with a satellite, which is enabled to send and receive data over the Internet; establishing a connection over the Internet with the remote server, whose interface is viewed by the user as a webpage on the web-ready device; prompting by the remote server of the user for a username and password; accessing a database by the remote server to verify the username and password; prompting the user to create a new account, if the username and password are invalid or the user's account has zero time remaining; charging the user's credit card, if a new account is created; allowing the user to access other websites, until the user's account has zero time remaining or the user logs off the network; and updating the user's account in the database by the remote server to subtract the amount of time used during the just-completed session when the user logs off the network. In a detailed embodiment the method further includes the step of installing the router and the satellite dish in a rural location experiencing a relatively high volume of transient traffic.

It is a third aspect of the present invention to provide an Internet Hotspot that includes: a satellite dish installed in a remote location experiencing a relatively high volume of transient traffic, and the satellite dish communicating with the Internet via data link with a satellite; at least one router operatively coupled to the satellite dish and installed in the remote location, where a user may access the Internet at the remote location by establishing a data connection with the router via a user's web-ready device. In a more detailed embodiment, the data connection is a wireless data connection. In another detailed embodiment, a plurality of users may access the Internet simultaneously at the remote location by respectively establishing data connections with the router via their web-ready devices. The data connections may be wired and/or wireless connections. The Hotspot may also include a subscriber access unit operatively coupled between the satellite dish and the router and/or at least one wireless extender transceiver wirelessly, operatively coupled between the router and the satellite dish.

It is a fourth aspect of the present invention to provide a method for establishing and operating an Internet Hotspot that includes the steps of: providing a satellite dish communicating with the Internet via data link with a satellite; providing at least one wireless access point operatively coupled to the satellite dish and located along a transit route; providing a wireless transceiver unit operatively coupled to the wireless access point and located on a transit vehicle adapted to travel along the transit route; and providing at least one router operatively coupled to the wireless transceiver unit and located on the transit vehicle; thereby allowing a user to access the Internet while onboard the transit vehicle by connecting a user's web-ready device to the Internet via the router and satellite dish. In a detailed embodiment, the method further includes the step of providing a plurality of wireless access points operatively coupled to the satellite dish and located along a transit route. In a more detailed embodiment, the plurality of wireless access points are located along the transit route such that substantially all points along the transit route are within the communications range of at least one wireless access point. The transit vehicle can be a train, bus, or other public transportation vehicle. The fourth aspect of the present invention can be practiced with all the embodiments and variations described above with respect to the first and second aspects.

It is a fifth aspect of the present invention to provide an Internet Hotspot that includes: a satellite dish communicating with the Internet via data link with a satellite; at least one wireless access point operatively coupled to the satellite dish and located along a transit route; a wireless transceiver unit operatively coupled to the wireless access point and located on a transit vehicle adapted to travel along the transit route; and at least one router operatively coupled to the wireless transceiver unit and located on the transit vehicle; whereby a user may access the Internet while onboard the transit vehicle by establishing a data connection with the router via a user's web-ready device. In a detailed embodiment, the Internet Hotspot further includes a plurality of wireless access points operatively coupled to the satellite dish and located along a transit route. In a more detailed embodiment, the plurality of wireless access points are located along the transit route such that substantially all points along the transit route are within the communications range of at least one wireless access point. The fifth aspect of the present invention can be practiced with all the embodiments and variations described above with respect to the third aspect.

DETAILED DESCRIPTION

The present invention provides rural "Hotspots" (such as Wi-Fi access, for example) to enable wireless and hardwired, satellite distributed Internet access for anyone with a PC or other web-ready device (wireless ready or cabled) and a valid credit card or prepaid coupon. The "Hotspots" can be located anywhere there is 120 volt electricity available, either from an electric utility service or from an on-site power source such as a solar panel with a bridged access point, and enough space to house the transceiver and mount a satellite dish. These "Hotspots" would best be located in areas that experience high volume transient traffic, such as rest area, restaurants, truck stops, rural hotels, conference centers, motels and state park lodges. Since the signal is always "live," all a potential wireless user would have to do is to move within the transceiver's field (an approximately radius of 0.2 to 0.4 miles when an amplifier is used, in an exemplary embodiment) and turn on his/her wireless ready PC to know the service was available. Alternatively, for those with cabled web-ready devices, signage can announce the availability of access to internal network ports. Because these internal network ports, if available, would always be "live," all a potential user would have to do is to plug in a web-ready device and logon. Several transceivers/routers (providing cabled and/or wireless access) can be installed to provide coverage for large or multi-floor sites.

In the exemplary embodiment, when a client attempts to access the Internet, they are routed through the "Subscriber Access Unit." This unit, utilizing radius client, automatically forces the user to first logon via satellite through a third party commercial site that houses the radius server. Internet access is granted upon activation of a valid credit card, or existing valid account. Access time is sold by the hour, day, week, or month, or as a "continued until canceled" subscription, and the validation and billing are done by an existing merchant service. Time purchased is durable until used within the purchased time unit (or one day, if purchased by the hour or day—whichever is less) and credits and accounts are reciprocal with other subscription providers nation-wide. Invalid credit cards or expired accounts are not permitted beyond the logon screen. Detailed transaction records are provided by the existing telecommunications infrastructure.

Figure 1:
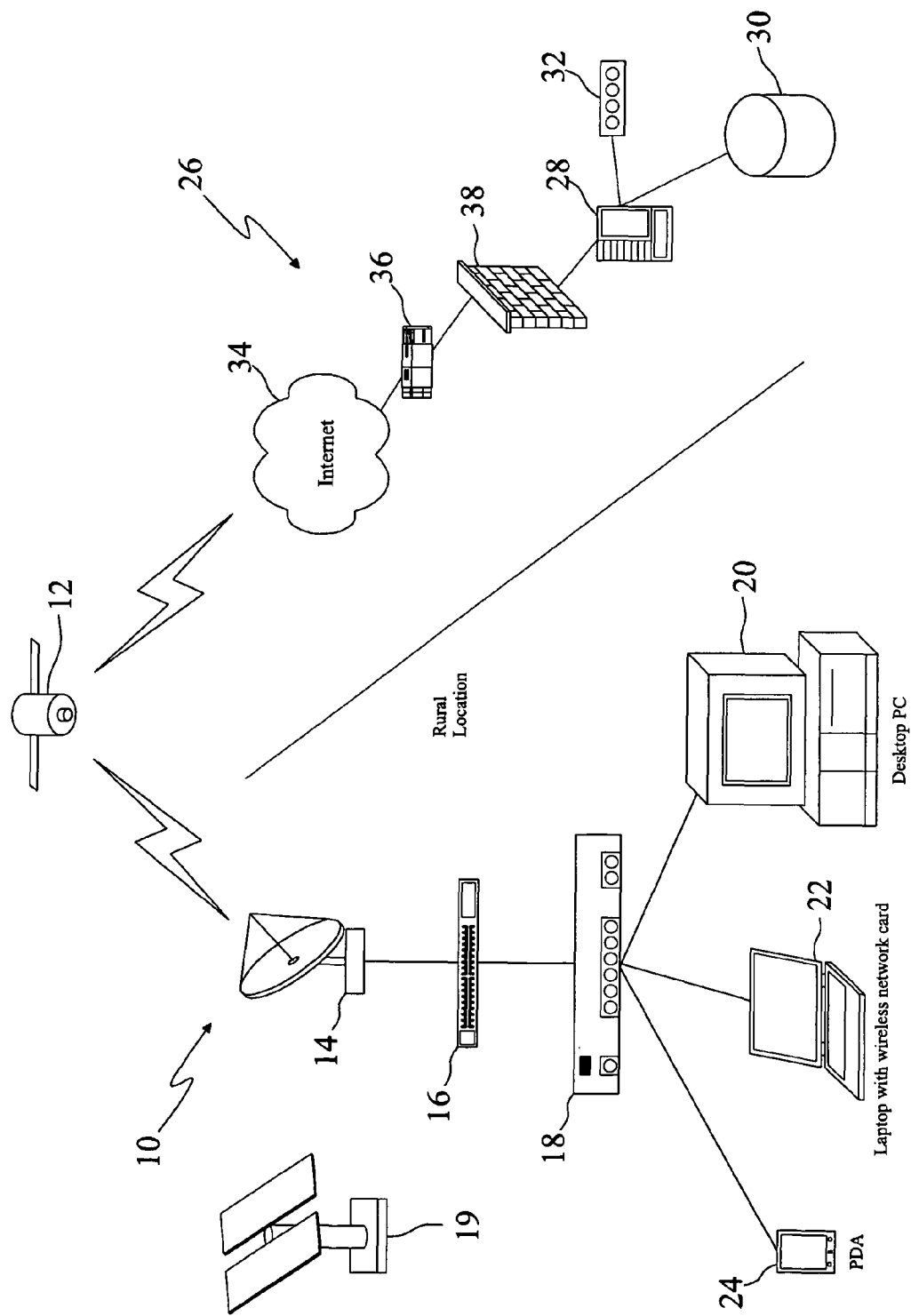
FIG. 1 shows an exemplary embodiment of the invention with a cabled router providing access to the Hotspot for cabled users.

An exemplary embodiment of the system providing access to cabled users is shown in FIG. 1. The Hotspot 10 comprises all the equipment installed at the rural location that is necessary to provide Internet access via satellite 12. The equipment installed at the rural location includes a satellite dish 14 for communicating with the satellite, a subscriber access unit 16 operatively coupled to the satellite dish 14 and a router 18 operatively coupled to the subscriber access unit 18. As used herein, the term "operatively coupled" refers to any configuration in which two or more devices interact in any way, by wired or wireless connections. Some or all of the components of the Hotspot 10 may be powered by a solar panel 19. User web-enabled devices, such as PC 20, laptop computer 22 and PDA 24 are directly coupled to the router via wired connections (i.e., cables). The user can access the Hotspot using his own web-ready device to acquire a dynamic IP address from one of many wired jacks located all over the router 18 using DHCP (Dynamic Host Configuration Protocol). The router 18 then forwards the user access to the subscriber access unit 16. Each router 18 can allow 254 concurrent users to gain access to the Internet.

At a central location 26, a radius server 28 includes a database 30 and modem 32 operatively coupled thereto. The radius server 28 is operatively coupled to the Internet 34 through an Internet server 36 and is protected by a firewall 38. The satellite 12 communicates to the radius server over the internet (via another satellite dish and associated computer—not shown).

The subscriber access unit 16 has the static IP address 36 of the Radius server 28 pre-programmed. It then uses Radius client software to send the user directly to the satellite dish 14. The user's connection then passes to the satellite 12 then through the Internet 34 where, using the Radius server's IP address 36, it finds the Radius server 28. The Static IP address 36 routes the traffic through the firewall 38.

Upon establishing a user connection to the Radius server 28, the Radius server is viewed as a webpage in SSL (Secure Socket Layer) by the user. The user is prompted for a username and password. The Radius server 28 uses the database 30 to validate username and password and check that the number of minutes left in the user's account is greater than 0. If the user cannot submit a valid username and password for an account that has more than zero minutes left, the user will be prompted to create a new account. Upon creating an account, the Radius server 28 will charge the credit card furnished by the user using the modem 32 or Internet 34.

Upon validation by database 30, the user can browse the Internet 34 until the minutes are used up or the user is logged off the network. When the user logs off, the database 30 will be updated, subtracting the minutes used during the just-completed session.

Figure 2:
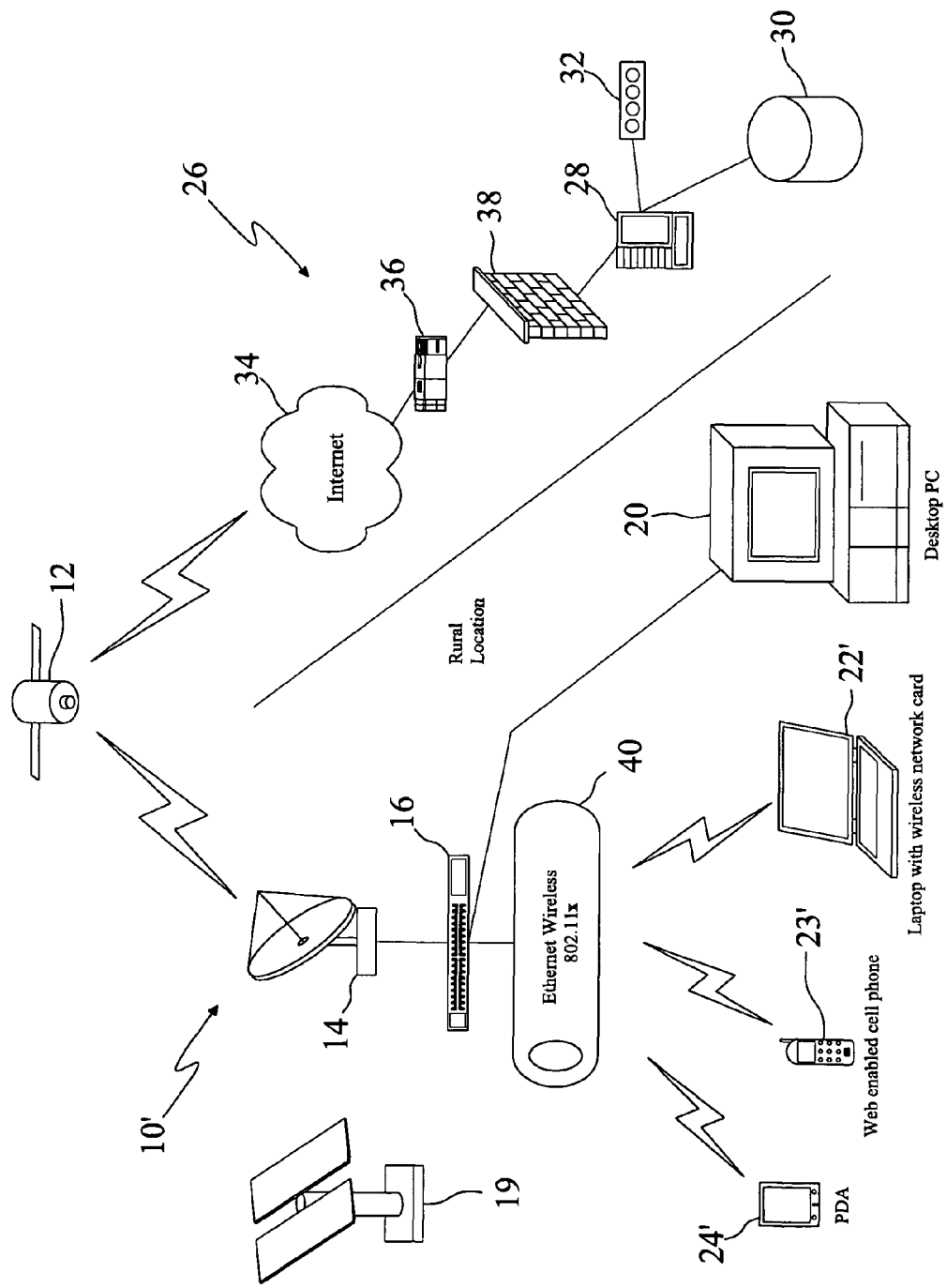
FIG. 2 shows an exemplary embodiment of the invention with an Ethernet wireless access point (wireless router) providing access to the Hotspot for wireless users.

Another exemplary embodiment 10' of the system providing access to wireless users is shown in FIG. 2. The basic system architecture and operation are substantially the same as described above. The main difference in the wireless access Hotspot of FIG. 2 is that the cabled router 18 of FIG. 1 has been replaced by an Ethernet wireless access point or router 40. The user can access the Hotspot using his own wireless web-ready device, such as a personal digital assistant (PDA) 24', web-enabled cell phone 23', or laptop computer with wireless network card 22' to acquire a dynamic IP address from the Ethernet wireless access point 40 using DHCP (Dynamic Host Configuration Protocol). The Ethernet wireless access point 40 then forwards the user access to the subscriber access unit 16. Each Ethernet wireless access point 40 can allow 254 concurrent users to gain access to the Internet 34. The Ethernet wireless access point 40 can employ a security protocol of a type that is known to persons skilled in the art, such as the 802.11b security protocol, or any subsequent or future versions of the 802 standard. Such security protocols may be generally designated as 802x, where x can be any version or implementation of the 802 standard.

From the subscriber access unit 16, a connection is established with the Radius server 28 in the substantially same manner as described above. The Radius server prompts the user to log in and verifies the user's password and account status, including the amount of time remaining, in substantially the same manner as described above.

Figure 3:
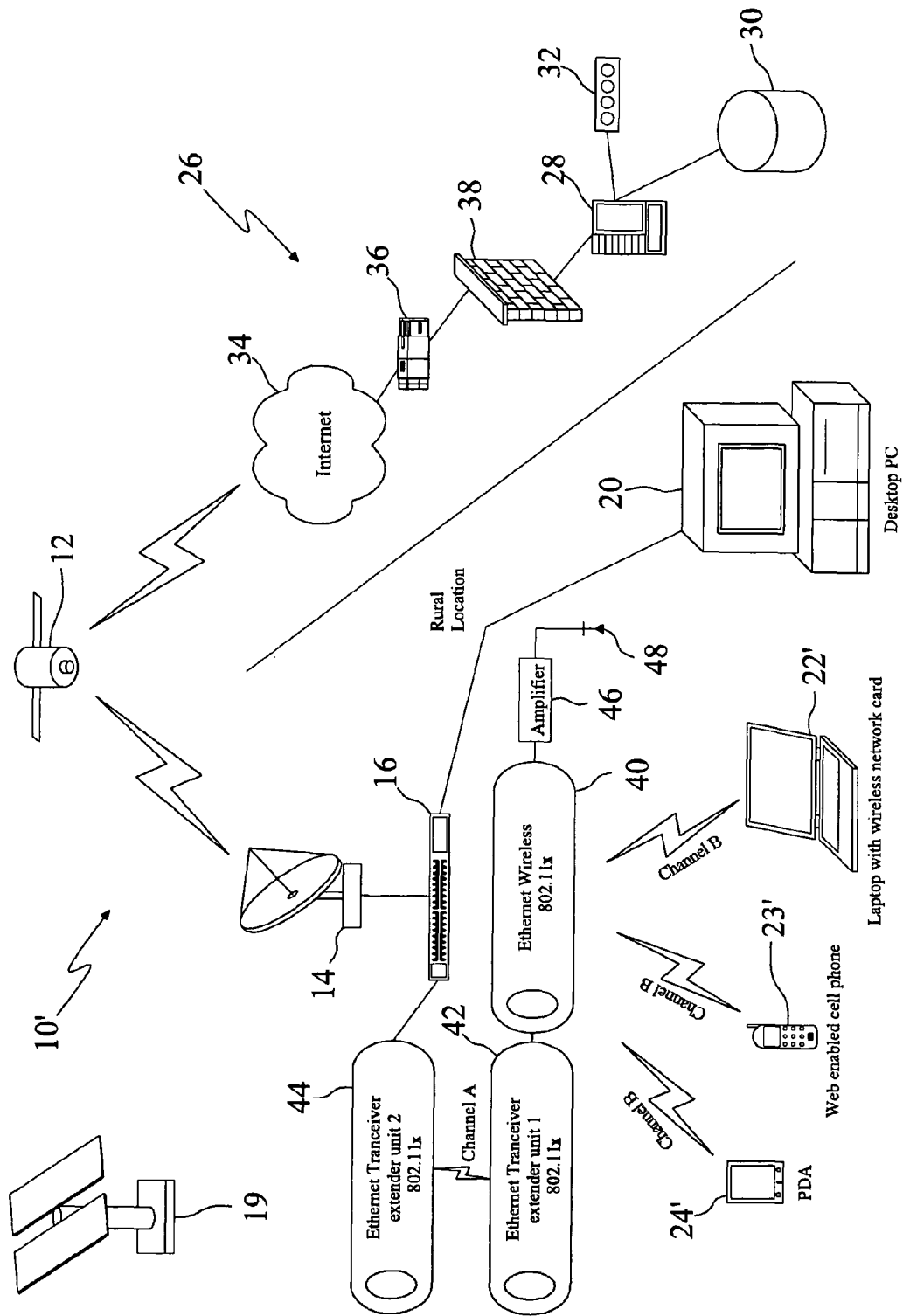
FIG. 3 shows an exemplary embodiment of the invention with wireless transceiver extender units, allowing the access point (Ethernet wireless access point or router) to be located remotely from the remainder of the Hotspot apparatus.

In another exemplary embodiment 10", as illustrated in FIG. 3, the Ethernet wireless access point 40 may be separated from, and communicate wirelessly with, the subscriber access unit 16. The Ethernet wireless access point 40 is connected by wire to wireless transceiver extender unit "1" (42). Utilizing a different channel from the Ethernet wireless access point 40, the wireless transceiver extender unit "1" (42) transmits and receives wirelessly to and from wireless transceiver extender unit "2" (44). Wireless transceiver extender unit "2" (44) will run directly by wire to the subscriber access unit 16. This use of wireless transceiver extender units 42, 44 allows the Ethernet wireless access point 40 to be placed further away, extending the effective range of the hotspot. The wireless transceiver extender units 42, 44 can employ a security protocol of the 802.x form, as explained above, where x can be any version or implementation of the 802 standard. From the subscriber access unit 16, a connection is established with the Radius server 28 in substantially the same manner as described above. The Radius server 28 prompts the user to log in and verifies the user's password and account status, including the amount of time remaining, in substantially the same manner as described above.

This wireless extension embodiment may also be practiced with a cabled router connected to wireless transceiver extender unit "1" (42) in place of Ethernet wireless access point 40, thus allowing cabled access with the router located remotely from the subscriber access unit 16.

In the exemplary embodiments 10' and 10" of the system shown in FIGS. 2 and 3, respectively, the Ethernet wireless access point can be operatively coupled to an amplifier 46 and antenna 48. The antenna 48 can be an omni-directional antenna or a directional antenna such as a yagi antenna. The amplifier in conjunction with the antenna can increase the DBi gain to 28 to 35 based on the DBi gain for the antenna selected. The total output of the antenna will not exceed the 36 DBi limited by current Federal Communications Commission regulations. Additional wireless access points or antennas can be added to widen the coverage area as needed, provided that the wireless beams of overlapping signal coverage will need to use different channels to prevent interference.

Figure 4:
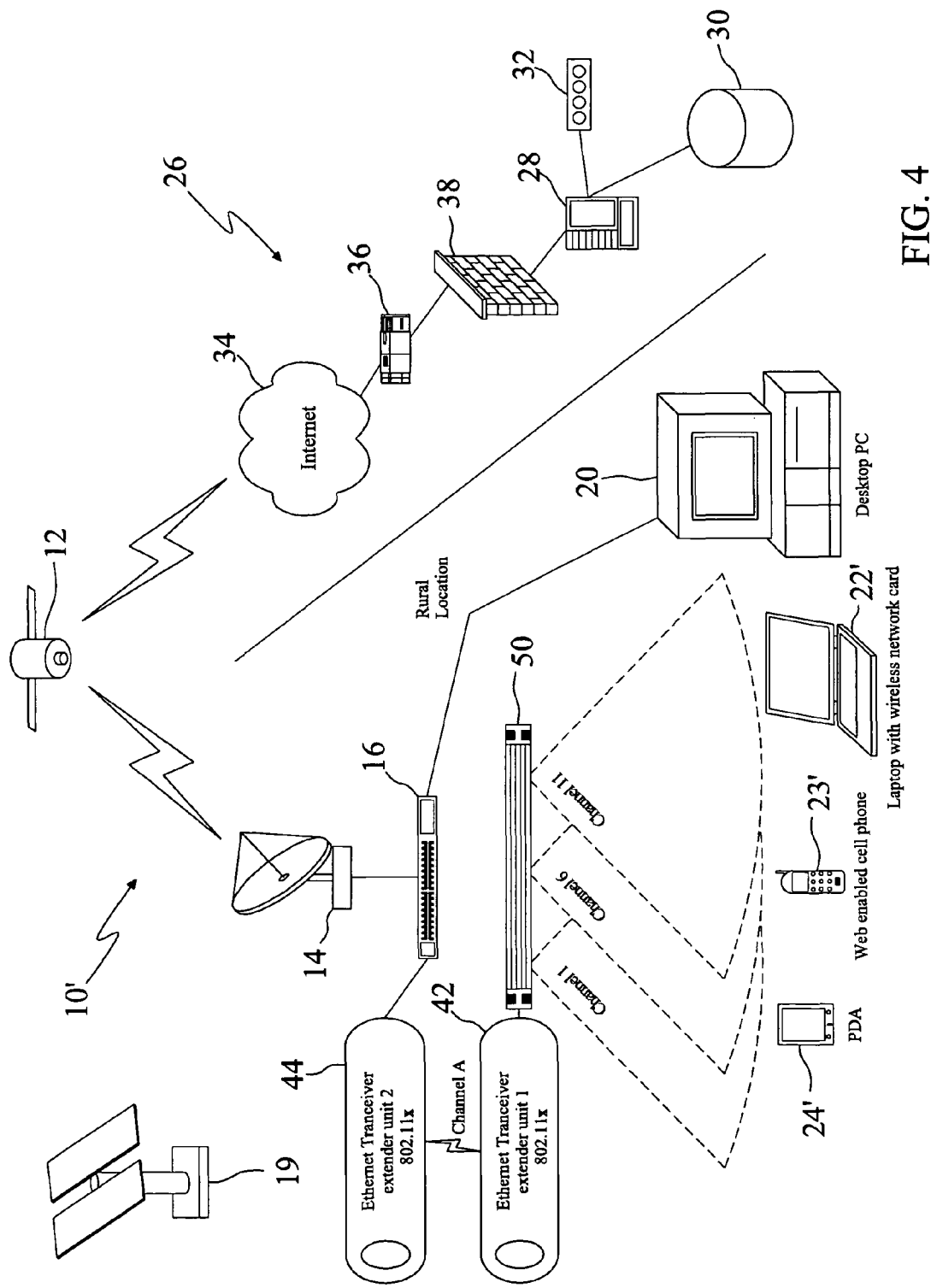
FIG. 4 shows an exemplary embodiment of the invention with a Vivato outdoor switch used as the wireless access point, providing long range operation.

Alternatively, as shown in FIG. 4, the wireless Ethernet access point can be replaced with a Vivato® outdoor switch 50 (such as the VP1210 available from Vivato, Inc), which includes an amplifier and antenna. The Vivato® outdoor switch features an electronically controlled phased array antenna that can be used to create high gain beams of Wi-Fi on three channels simultaneously. In order to prevent interference, three nonadjacent channels (e.g., channels 1, 6, and 11, as shown in FIG. 4) can be selected from the eleven channels supported by the 802.11x communication protocol. This embodiment can provide Wi-Fi access for many kilometers along a line of sight from the antenna, providing three simultaneous beams of Wi-Fi throughout the coverage area with extended range.

Figure 5:
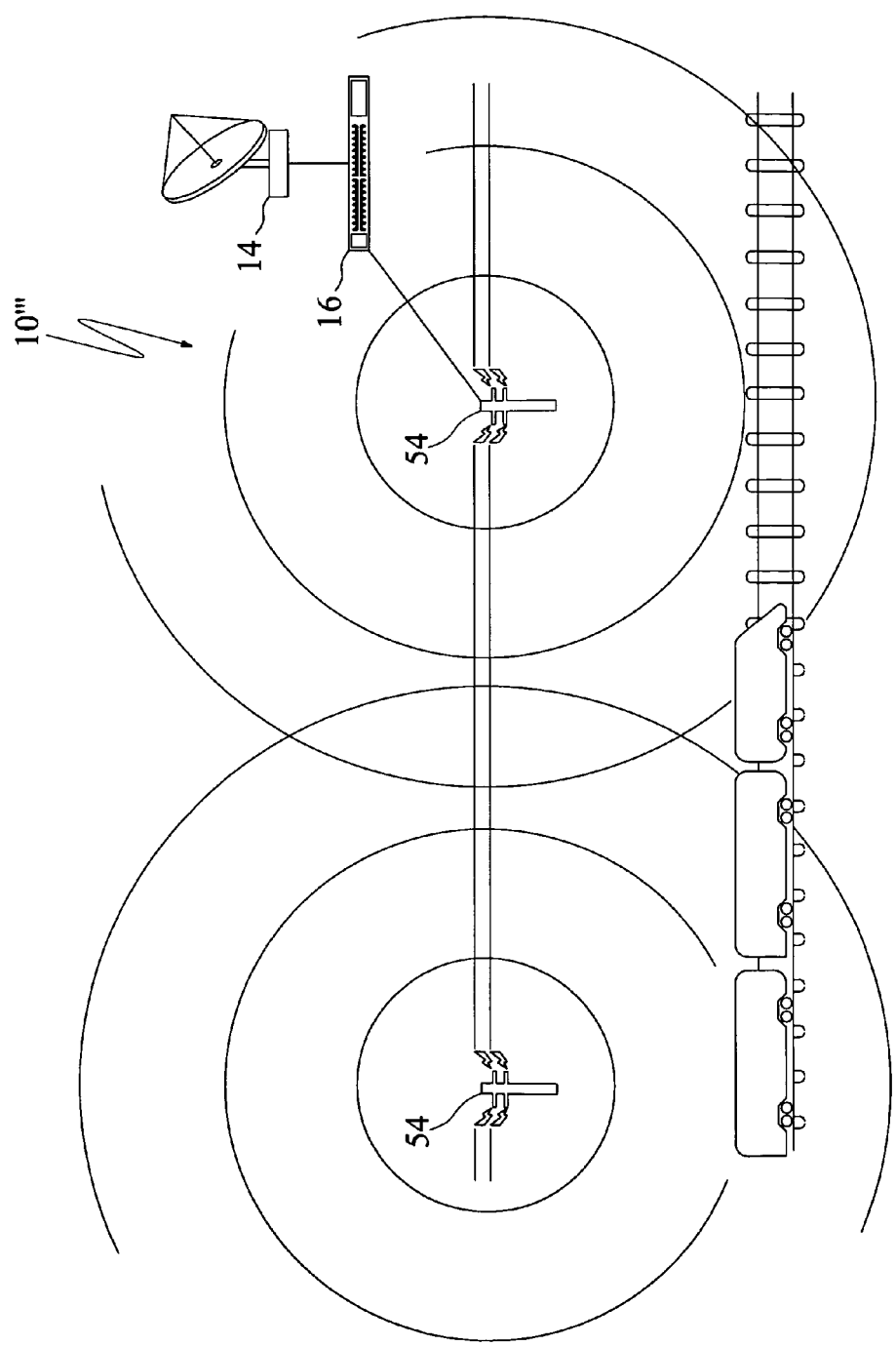
FIG. 5 shows an exemplary embodiment of the invention in which the Hotspot is located on a transit vehicle such as a train.

In another exemplary embodiment 10''', as illustrated in FIG. 5, the Hotspot can be adapted to be accessed by users on a mobile transport unit such as a train or other form of public transportation. Access to the Internet is acquired via satellite, cable, T1 line, or other means and then extended point-point or point-to-multipoint to various access points located on bridges 54 along the track and mounted above the buffeting wind potential of a train. These access points then rebroadcast the Internet signals along the track. By spacing these access points sufficiently close that each point along the track is within the broadcast range of at least one access point, the train can have uninterrupted access to the Internet as it moves along the track. Users on the train can then connect their web-ready devices to the Internet utilizing a wireless access point or router on the train in the same manner as discussed above. A transceiver unit, similar to the wireless transceiver extender unit discussed above, mounted on the train maintains the connection to the bridge access points while moving down the track, and the users' machines maintain the connection to the train's wireless access point or router, each user utilizing a different channel from the bridge. By utilizing a transceiver unit on the train to maintain a connection with the bridge access points, this configuration eliminates the individual users' concern with maintaining an outside connection moving a high rate speed with potential of loss of signal.

Having described the invention with reference to exemplary embodiments, it is to be understood that the invention is defined by the claims and it not intended that any limitations or elements describing the exemplary embodiment set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A method comprising:
receiving at a router a user access from a user device, and forwarding the user access from the router to a wireless transceiver, wherein the router and wireless transceiver are disposed on a transit vehicle adapted to travel along a transit route;
transmitting the user access to at least one of a plurality of wireless access points at respective fixed locations along the transit route, the plurality of wireless access points operatively coupled to each other; and
establishing a connection between the user device and a remote server via a subscriber access unit connected to at least one of the plurality of wireless access points and a satellite dish,
wherein the user device opens a subscription account via the remote server before the user device is enabled to access other websites.

2. The method of claim 1, wherein the router includes at least one jack to which a web-ready device may be connected via a cable.

3. The method of claim 1, wherein the user device opens the subscription account using a prepaid coupon via the remote server before the user device is enabled to access other websites.

4. The method of claim 1, wherein the user device purchases a quantity of subscription-based access time using a credit card via the remote server before the user device is enabled to access other websites.

5. The method of claim 4, wherein the subscription-based access time is purchased in a definite quantity.

6. The method of claim 4, wherein the subscription-based access time is purchased on a "continued until canceled" basis.

7. The method of claim 4, wherein credit card billing is performed by a merchant service.

8. The method of claim 7, wherein the merchant service is reciprocal with other Internet subscription providers nationwide.

9. The method of claim 4, wherein an account status is authenticated by the remote server each time the user device establishes a connection with the remote server before the user device is enabled to access other websites.

10. The method of claim 9, wherein authentication of the account status is performed by a subscriber merchant service.

11. The method of claim 1, further comprising:
establishing data connections between a plurality of user devices and the router so that the plurality of user devices can simultaneously access the Internet.

12. The method of claim 11, wherein the user device opens the subscription account using a prepaid coupon via the remote server before the user device is enabled to access other websites.

13. The method of claim 11, wherein the user device purchases a quantity of subscription-based access time using a credit card via the remote server before the user device is enabled to access other websites.

14. The method of claim 13, wherein the subscription-based access time is purchased in a definite quantity.

15. The method of claim 13, wherein the subscription-based access time is purchased on a "continued until canceled" basis.

16. The method of claim 13, wherein credit card billing is performed by a merchant service.

17. The method of claim 16, wherein the merchant service is reciprocal with other Internet subscription providers nationwide.

18. The method of claim 13, wherein the account status is authenticated by the remote server each time the user device establishes a connection with the remote server before the user device is enabled to access other websites.

19. The method of claim 18, wherein authentication of the account status is performed by a subscriber merchant service.

20. The method of claim 1, wherein the plurality of wireless access points are located at fixed locations along the transit route such that substantially all points along the transit route are within the communications range of at least one of the plurality of wireless access points.

21. The method of claim 1, wherein the transit vehicle is a public transportation vehicle.

22. The method of claim 1, wherein the transit vehicle is a train and the transit route comprises a railroad track.

23. The method of claim 1, wherein the transit vehicle is a bus and the transit route comprises a roadway.

24. The method of claim 1, further comprising:
prompting the user device for a user name and password, verifying the password and an account status for the user device, and thereafter enabling the user device to access the Internet.

25. The method of claim 24, wherein upon establishing the connection with the remote server, the remote server is viewable at the user device as a webpage in a Secure Socket Layer (SSL).

26. The method of claim 24,
wherein the transit vehicle is a train and the transit route comprises a railroad track, and
wherein the user device comprises a cell phone.

27. An Internet Hotspot comprising:
a plurality of wireless access points installed at respective fixed locations along a transit route, each of the wireless access points being operatively coupled to each other;
a wireless transceiver unit operatively coupled to at least one of the wireless access points and located on a transit vehicle adapted to travel along the transit route;
at least one router operatively coupled to the wireless transceiver unit and located on the transit vehicle; wherein the at least one router is operable to receive a user access from a user device and to forward the user access to the wireless transceiver unit, and wherein the wireless transceiver unit is operable to transmit the user access to at least one of the wireless access points; and
a subscriber access unit operatively coupled to at least one of the plurality of wireless access points and a satellite dish, wherein the subscriber access unit is operable to establish a data connection between the user device and a remote server,
wherein the user device opens a subscription account via the remote server before the user device is enabled to access other websites.

28. The Internet Hotspot of claim 27, wherein the data connection is a wireless data connection.

29. The Internet Hotspot of claim 27, wherein a plurality of user devices are operable to establish data connections with the at least one router so that the plurality of user devices can access the Internet simultaneously.

30. The Internet Hotspot of claim 29, wherein the data connections include wired data connections.

31. The Internet Hotspot of claim 29, wherein the data connections include wireless data connections.

32. The Internet Hotspot of claim 27, wherein the plurality of wireless access points are located along the transit route such that substantially all points along the transit route are within the communications range of at least one of the plurality of wireless access points.

33. An Internet Hotspot comprising:
a satellite dish operable to communicate with the Internet via a data link established with a satellite;
a plurality of electronically controlled phased array antennas installed at respective fixed locations along a transit route, each of the electronically controlled phased array antennas being configured to generate a plurality of beams on a plurality of wireless data channels, and each of the electronically controlled phased array antennas being operatively coupled to the satellite dish;
a wireless transceiver unit operatively coupled to at least one of the electronically controlled phased array antennas and located on a transit vehicle adapted to travel along the transit route; and
at least one router operatively coupled to the wireless transceiver unit and located on the transit vehicle,
wherein the router is operable to provide a data connection to a user device that is onboard the transit vehicle.

34. The Internet Hotspot of claim 33, further comprising:
a first wireless access point;
a second wireless access point that is connected to one of the electronically controlled phased array antennas via wire; and
a subscriber access unit that is connected to the first wireless access unit and to the satellite dish via wire,
wherein the first wireless access point communicates with the second wireless access point via a wireless data channel other than the plurality of wireless data channels used by the electronically controlled phased array antennas.

35. The Internet Hotspot of claim 34,
wherein the subscriber access unit comprises an IP address of a Radius server; and
wherein the subscriber access unit is operable to establish a connection between the user device and the Radius server so as to provide the user device with access to the Internet.

36. The Internet Hotspot of claim 33, wherein the plurality of wireless data channels comprises a plurality of non-adjacent wireless data channels.

37. An apparatus comprising:
a transit vehicle adapted to travel along a transit route, wherein a plurality of wireless access points operatively coupled to each other are installed at respective fixed locations along the transit route, wherein at least one of the wireless access points is operatively coupled to a subscriber access unit that is operatively coupled to a satellite dish, wherein the satellite dish is operable to communicate with the Internet;
a wireless transceiver unit that is located on the transit vehicle, wherein the wireless transceiver unit is operable to maintain a data connection with the plurality of wireless access points as the transit vehicle moves along the transit path, and wherein the wireless access transceiver can operatively couple to the at least one of the wireless access points that is operatively coupled to the subscriber access unit; and
a router that is located on the transit vehicle and that is operatively coupled to the wireless transceiver unit, wherein the router is operable to receive a user access from a user device and to forward the user access to the wireless transceiver unit,
wherein the wireless transceiver unit is operable to forward the user access to the subscriber access unit for transmission, in turn, to the satellite dish and from the satellite dish to a remote server that is operable to authenticate the user device for access to the Internet,
wherein the subscriber access unit is operable to establish a connection between the user device and the remote server, and
wherein the router is operable to maintain the data connection with the user device as the transit vehicle moves along the transit path so that the user device can access the Internet via the router.

38. An apparatus comprising:
a plurality of wireless access points that are installed at respective fixed locations along a transit route, wherein each of the wireless access points is operatively coupled to each other, and wherein at least one of the wireless access points can operatively couple to a wireless transceiver unit located on a transit vehicle that is adapted to travel along the transit route; and
a subscriber access unit that is operatively coupled to at least one of the plurality of wireless access points and a satellite dish, wherein the subscriber access unit is operable to establish a data connection between a user device on the transit vehicle and a remote server via the Internet,
wherein at least one of the wireless access points is operable to receive from the wireless transceiver unit a user access that is transmitted from the user device to a router on the transit vehicle and from the router to the wireless transceiver unit, and
wherein the remote server opens a subscription account for the user device before the user device is enabled to access other websites.

* * * * *